United States Patent [19]

Nokihara et al.

[11] Patent Number: 4,488,273
[45] Date of Patent: Dec. 11, 1984

[54] MAGNETIC REPRODUCING APPARATUS CAPABLE OF RECEIVING RADIO BROADCAST PROGRAMS

[75] Inventors: Yutaka Nokihara; Hironori Nakajyo, both of Yokohama, Japan

[73] Assignee: Tokyo Shibaura Denki Kabushiki Kaisha, Kanagawa, Japan

[21] Appl. No.: 485,138

[22] Filed: Apr. 20, 1983

Related U.S. Application Data

[63] Continuation of Ser. No. 274,505, Jun. 17, 1981, abandoned.

[30] Foreign Application Priority Data

Jul. 15, 1980 [JP] Japan ................................. 55-96635

[51] Int. Cl.³ ............................................. G11B 31/00
[52] U.S. Cl. .................................................... 369/11
[58] Field of Search .................... 369/6, 7, 10, 11, 12; 360/137

[56] References Cited

U.S. PATENT DOCUMENTS 3,597,553 8/1971 Ban ........................................ 369/11
3,612,776 10/1971 Ban ........................................ 369/11
3,978,524 8/1976 Gordon et al. ...................... 369/11

FOREIGN PATENT DOCUMENTS

EP44216 1/1982 European Pat. Off. ............. 369/11
EP44678 1/1982 European Pat. Off. ............. 369/11
4251600 1/1972 Japan .

Primary Examiner—Donald E. McElheny, Jr.
Attorney, Agent, or Firm—Banner, Birch, McKie & Beckett

[57] ABSTRACT

A magnetic reproducing apparatus is disclosed which is capable of receiving radio broadcast programs when a cassette type tuner unit is inserted in a cassette holding portion of the apparatus. The apparatus includes a protection mechanism which prevents the pinch roller of the apparatus from contacting the capstan when the apparatus is operating in the radio broadcast receiving mode.

13 Claims, 38 Drawing Figures

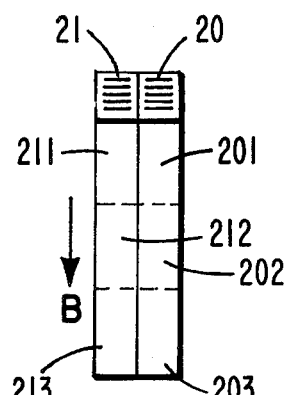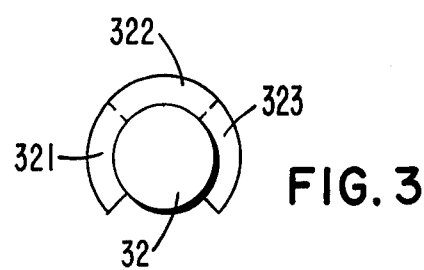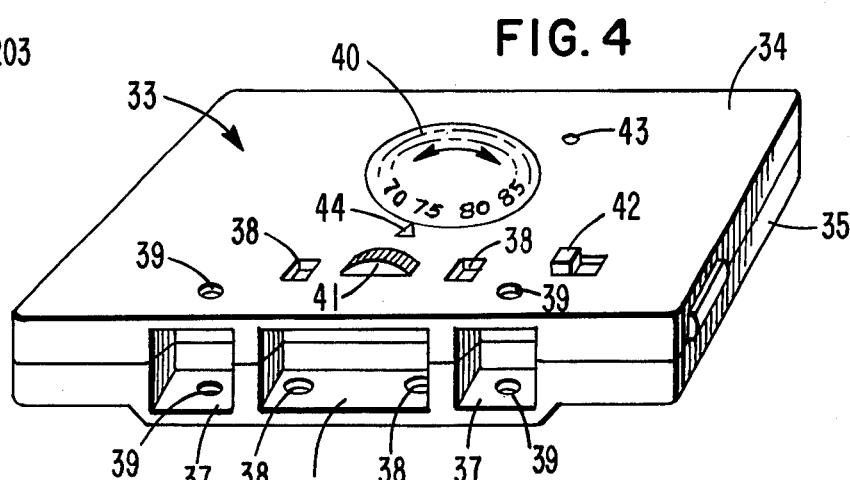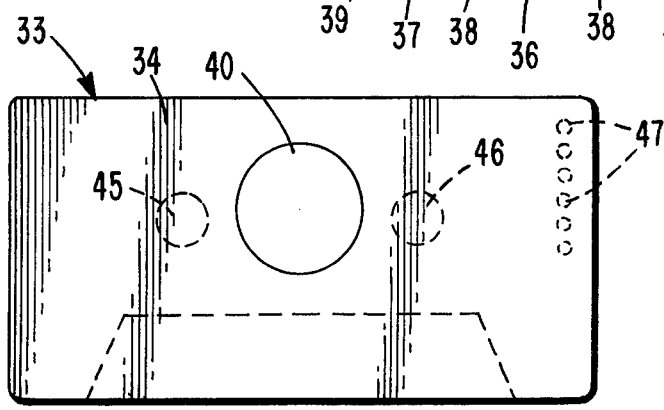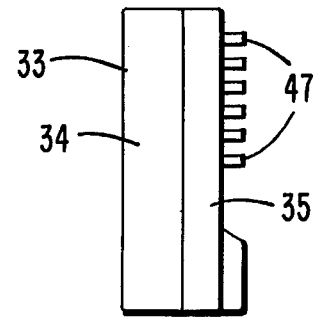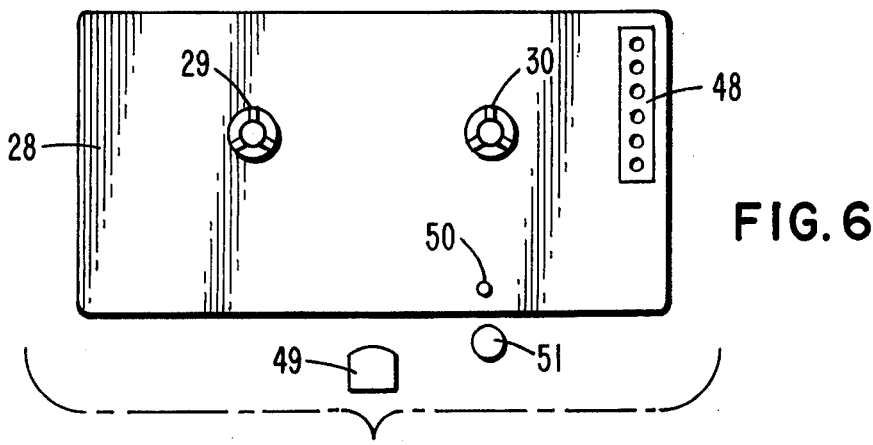

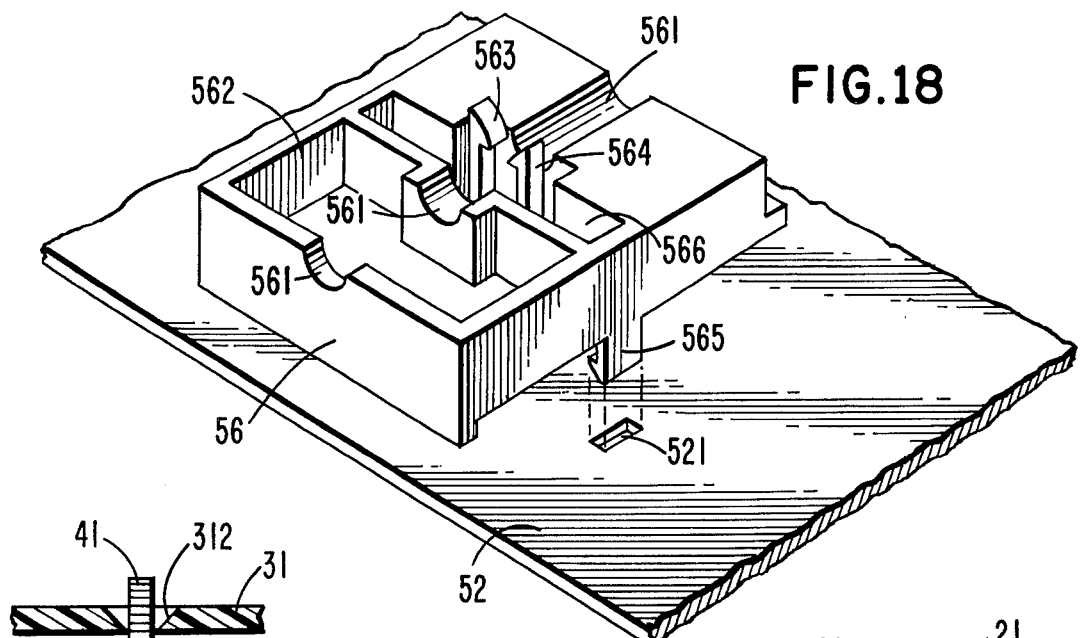
FIG.18
FIG.20
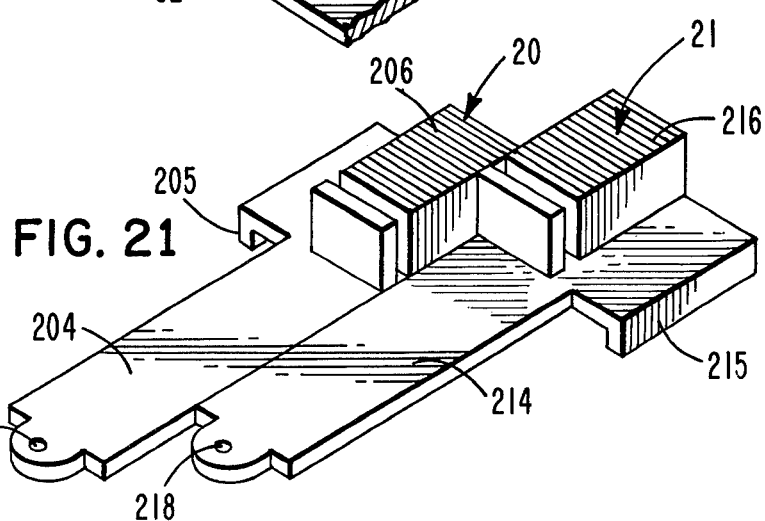
FIG.21
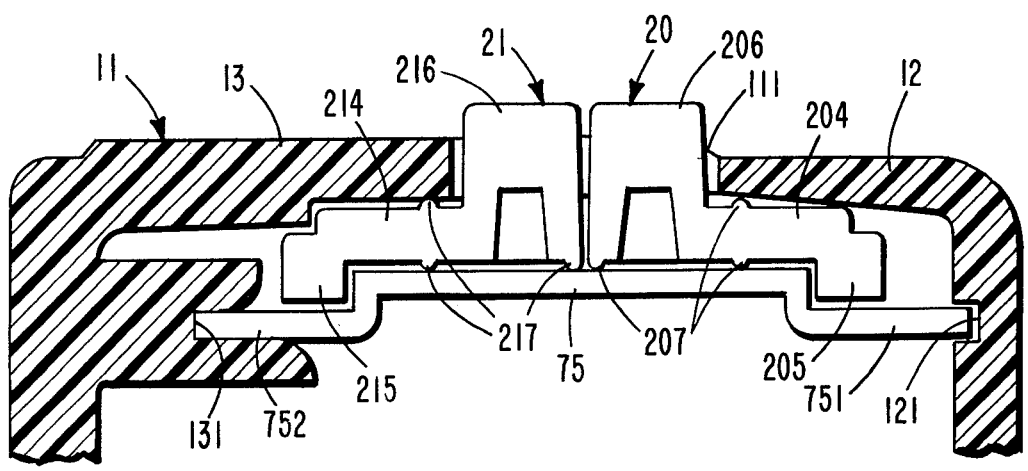
FIG.22

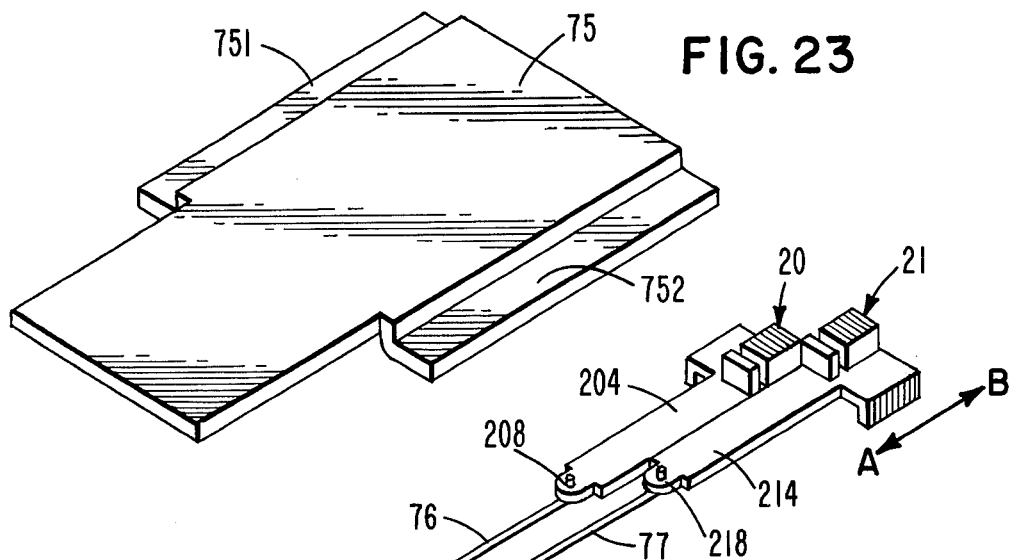
FIG. 23
FIG. 24
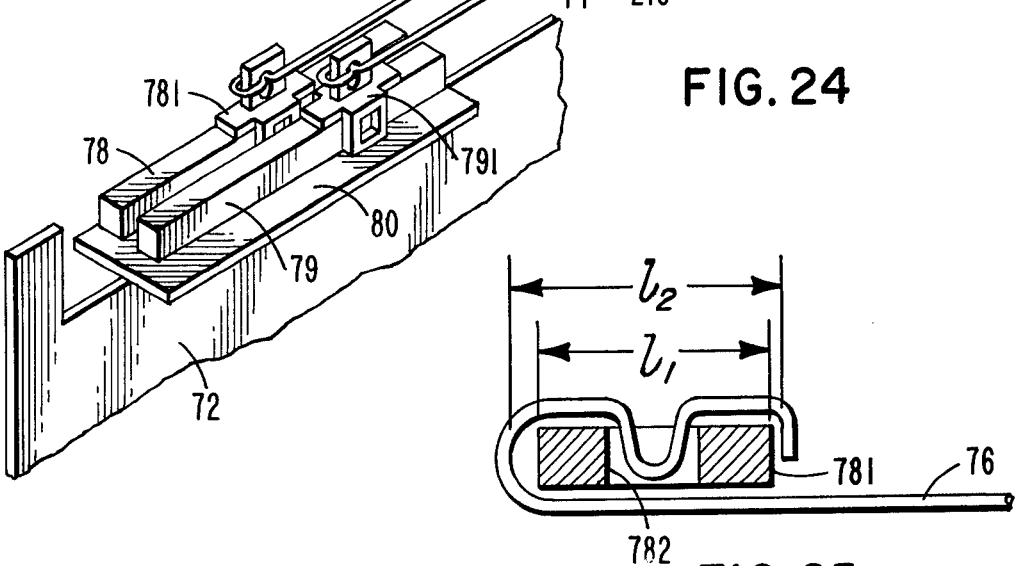
FIG. 25
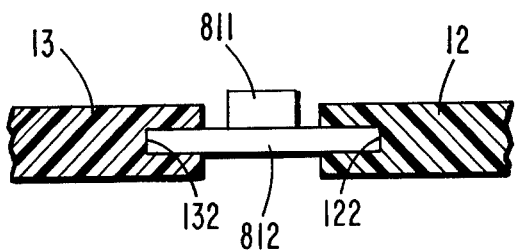
FIG. 26a
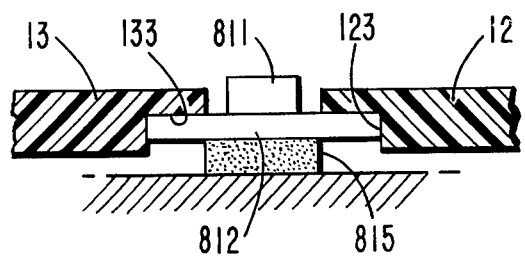
FIG. 26b

MAGNETIC REPRODUCING APPARATUS CAPABLE OF RECEIVING RADIO BROADCAST PROGRAMS

This application is a continuation of application Ser. No. 274,505, filed June 17, 1981, now abandoned.

BACKGROUND OF THE INVENTION

This invention relates to a magnetic reproducing apparatus, and particularly, to magnetic reproducing apparatus capable of receiving radio broadcast programs.

Recently, a magnetic reproducing apparatus has been developed which is compact in size and light in weight, and which reproduces stereo programs. One popular apparatus, which does not have a recording function and loudspeaker, includes a headphone which enables a user to walk and listen to the reproduced sound. This apparatus is designed to reproduce recorded tracks on tape and also to receive radio broadcast programs by inserting a cassette type tuner unit. The tuner unit includes receiving, tuning, detecting and amplifying portions, etc. The user listens to the radio when he inserts the cassette type tuner unit in the cassette holding portion of the apparatus. The apparatus includes a PLAY button which functions as a switch for listening to the radio. One disadvantage of this apparatus is that the pinch roller of the magnetic reproducing device continues to contact the capstan during radio listening.

SUMMARY OF THE INVENTION

An object of the present invention is to provide a magnetic reproducing apparatus which enables a user to listen to radio broadcast programs in high fidelity by inserting a cassette type tuner unit.

Another object of the present invention is to provide a protection mechanism means which prevents the pinch roller of the magnetic reproducing apparatus from contacting the capstan when the cassette type tuner unit is inserted in the cassette holding portion of the apparatus.

According to the present invention, a magnetic reproducing apparatus includes a main chassis or body and a cassette holding portion contained on the body of the apparatus for holding a tape cassette. A switch is included in the apparatus for setting the apparatus in a reproducing mode or a radio broadcast receiving mode. A capstan is attached to the main chassis and protrudes into the cassette holding portion. A pinch lever is also attached to the main chassis and is movable in the direction of the capstan in response to operation of the apparatus in the reproducing mode. The pinch roller is rotatably mounted on the pinch lever. A tuner unit, which has approximately the same shape and size as a tape cassette, is inserted when the apparatus is used in the radio braodcast receiving mode. Finally, when the apparatus operates in the latter mode, a protection mechanism prevents the pinch roller from contacting the capstan upon insertion of the tuner unit in the cassette holding portion.

The objects and advantages of the present invention will become apparent to persons skilled in the art from a study of the following description of the accompany drawings.

BRIEF DESCRIPTION OF THE DRAWINGS

FIG. 2 is a plan view of volume control sliders of the apparatus of FIG. 1.

FIG. 3 is a plan view of a modified volume control device for the apparatus of FIG. 1.

FIG. 4 is a perspective view of the external appearance of a tuner unit for the magnetic reproducing apparatus of FIG. 1.

FIGS. 5 (a) is a plan view of the tuner unit and (b) is a side view.

FIG. 6 is a rear view of the tuner unit.

FIG. 18 is a perspective view of a support structure for the program selecting dial.

FIG. 20 is a cross-sectional view of a cassette cover and the dial.

FIG. 21 is a perspective view of a pair of volume control sliders.

FIG. 22 is a cross-sectional view of the cabinet of the apparatus and the volume control sliders.

FIG. 23 is a perspective view of a support plate which supports the volume control sliders in the cabinet.

FIG. 24 is a perspective view showing the relation between the volume control sliders and a pair of variable resistors.

FIG. 25 is a cross-sectional view of a slider of the variable resistor and a wire which links the volume control slider with the resistor.

FIGS. 26 (a) and (b) are cross-sectional views showing the attachment of a modified volume control slider to the cabinet of the apparatus.

DESCRIPTION OF THE PREFERRED EMBODIMENT

Figure 1:
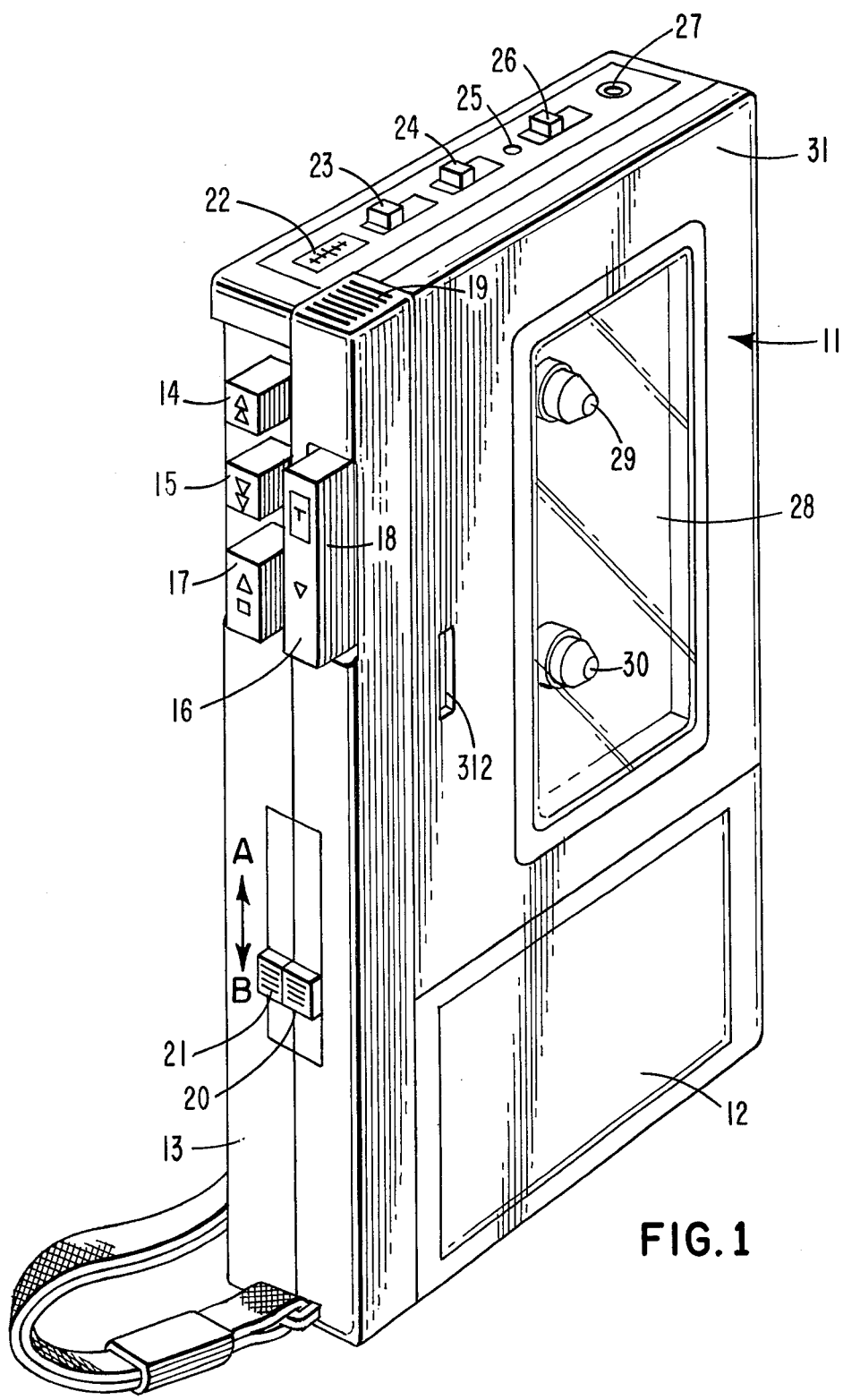
FIG. 1 is a perspective view of the external appearance of a magnetic reproducing apparatus according to the present invention.

The external appearance of a pocket size body 11 of the magnetic reproducing apparatus is shown in FIG. 1. The body 11 is formed by a box-shaped cabinet having front and back cabinets 12, 13. Buttons 14–17 for rewinding (REW), fast forwarding (FF), reproducing (PLAY) and STOP-EJECT are positioned at the left side of the cabinet. A TALK button 18 is integral with PLAY button 16, and may be pressed together with PLAY button 16. When TALK button 18 is pressed during reproducing or broadcast (radio) listening, the user can listen to the sound picked up by a built-in microphone 19, which is positioned at the top side of the cabinet. PLAY button 16 also functions as a switch for radio listening.

While a tape is playing, if FF button 15 is pressed and held in, the tape will rapidly move forward to enable the user to find a particular point in the recorded program (the CUE function). If REW button 14 is pressed and held in while the tape is playing, the tape will rewind to again enable the user to find a particular point in the recorded program (the REVIEW function). If the apparatus is in the reproducing, fast-forwarding or rewinding mode and STOP-EJECT botton 17 is pressed, button 14, 15 or 16 will be released. If STOP-EJECT botton 17 is pressed a second time (the double ejection function), the tape cassette will be ejected.

A pair of volume control sliders 20, 21 are positioned under buttons 14 to 17 at the left side of body 11. These sliders 20 and 21, which are for right and left stereo channels, are slidable in the direction of arrows A and B. The volume increases as the sliders slide in the direction of arrow B.

A battery indicator 22, tape selector 23 and noise reduction selector 24 are positioned at the top side of body 11. A radio indicator lamp 25, radio tape selector 26 and headphone jack 27 are also positioned at the top side of body 11. Battery indicator 22 indicates battery charge. Tape selector 23 is used to select the kind of tape (e.g., normal tape or chrome tape).

Noise reduction selector 24 is used to select the particular noise reduction technique. Radio tape selector 26 can be set to RADIO for listening to radio or to TAPE for playing tape cassettes. When selector 26 is set to RADIO, lamp 25 turns on and a tape transportation motor (not shown) is shut off to save battery charge. While a tape is playing, if selector 26 is set to RADIO, the tape transportation motor is shut off to perform the PAUSE operation. A headphone (not shown), which is plugged into jack 27, has a cord which is utilized as an antenna for the radio.

The body 11 has a box-shaped holding portion 28 on the front side which holds a tape cassette. Holding portion 28 includes a pair of reel holders 29 and 30, a pair of guide pins for the tape cassette, a reproducing head, a pinch roller and capstan. Holding portion 28 is covered by a cassette cover 31 which is pivotally mounted on body 11. Cover 31 has a viewing portion which consists of a transparent acrylate plate.

Volume control sliders 20, 21 are shown in further detail in FIG. 2. Since the apparatus does not include a loudspeaker, the user can only listen with a headphone. Accordingly, to protect the user's normal hearing ability, sliders 20 and 21 are color coded to indicate volume scale. The scale consists of red, yellow and green zones (201 and 211), (202 and 212) and (203 and 213) in the direction of arrow B. Red zones 203 and 213 on the scale indicate a volume range for allowable continuous listening of over 90 minutes; yellow zones 202 and 212 indicate a volume range for allowable continuous listening between 60 and 90 minutes; and green zones 203 and 213 indicate a volume range for allowable continuous listening of 60 minutes or less. Accordingly, the user can easily determine the proper volume according to his listening time, without the risk of hearing damage.

As shown in FIG. 3, another precaution for headphone listening is volume control device 32, which is a rotatable type. Device 32 has a color-classified level scale 324, which consists of red, yellow and green zones 321, 322, 323.

A tuner unit for receiving FM radio signals is shown in FIG. 4. The tuner unit has a casing 33, which has the same shape and size as a tape cassette. Casing 33, which includes front and rear casings 34 and 35, has recesses 36 and 37 at one side for receiving the head and pinch roller. The center recess 36 has two pair of penetration holes 38 for receiving the cassette guide pins. Side recesses 37 have a pair of penetration holes 39 for receiving the capstan.

Front casing 34 has a tuning indication plate 40, program selecting dial 41, MONO-STEREO selecting switch 42 and FM STEREO-MONO indicator 43. Tuning indication plate 40 has a circular shape and a scale along its circumference which indicates tuning frequencies. Plate 40 is turned in the clockwise and counter-clockwise directions in response to operation of dial 41. A tuning frequency numeral on the scale of plate 40 is identified by a triangular shaped indicator 44, which is positioned between plate 40 and dial 41. Indicator 43 is a light-emitting diode (LED) which is turned on for FM STEREO listening and turned off for MONO listening. A tuner unit for listening to both AM and FM broadcast programs may be used in place of the tuner unit of FIG. 4.

Plan and side views of the tuner unit are shown in FIGS. 5(a) and (b). Rear casing 35 has a pair of recesses 45 and 46 on both sides for receiving reel holders 29 and 30. It also has plural electrode pins 47 at its right side which include the power source input terminal, input and output signal terminals, etc.

Holding portion 28 of the apparatus is shown in detail in FIG. 6. An electrode receiving device 48 is positioned at the right side opposite to electrode pins 47 of casing 33. When the tuner unit is inserted in holding portion 28, pins 47 contact device 48 to provide an electrical couple. A capstan 50 is positioned at the front of holding portion 28 and head 49 and pinch roller 51 are positioned in the vicinity of holding portion 28.

Since pins 47 are positioned in the rear of the tuner unit, electrode pins 47 are pressed by the weight of the tuner unit in the direction of receiving device 48 when the tuner unit is put in holding portion 28. Pins 47 also are pressed by a cassette holding spring (not shown) positioned near cassette cover 31 or in holding portion 28. Accordingly, pins 47 are reliably coupled to receiving device 48. Furthermore, since an output signal of the tuner unit is supplied directly to the apparatus body 11 via pins 47 and receiving device 48, signal loss is decreased and tone is improved.

Figure 7:
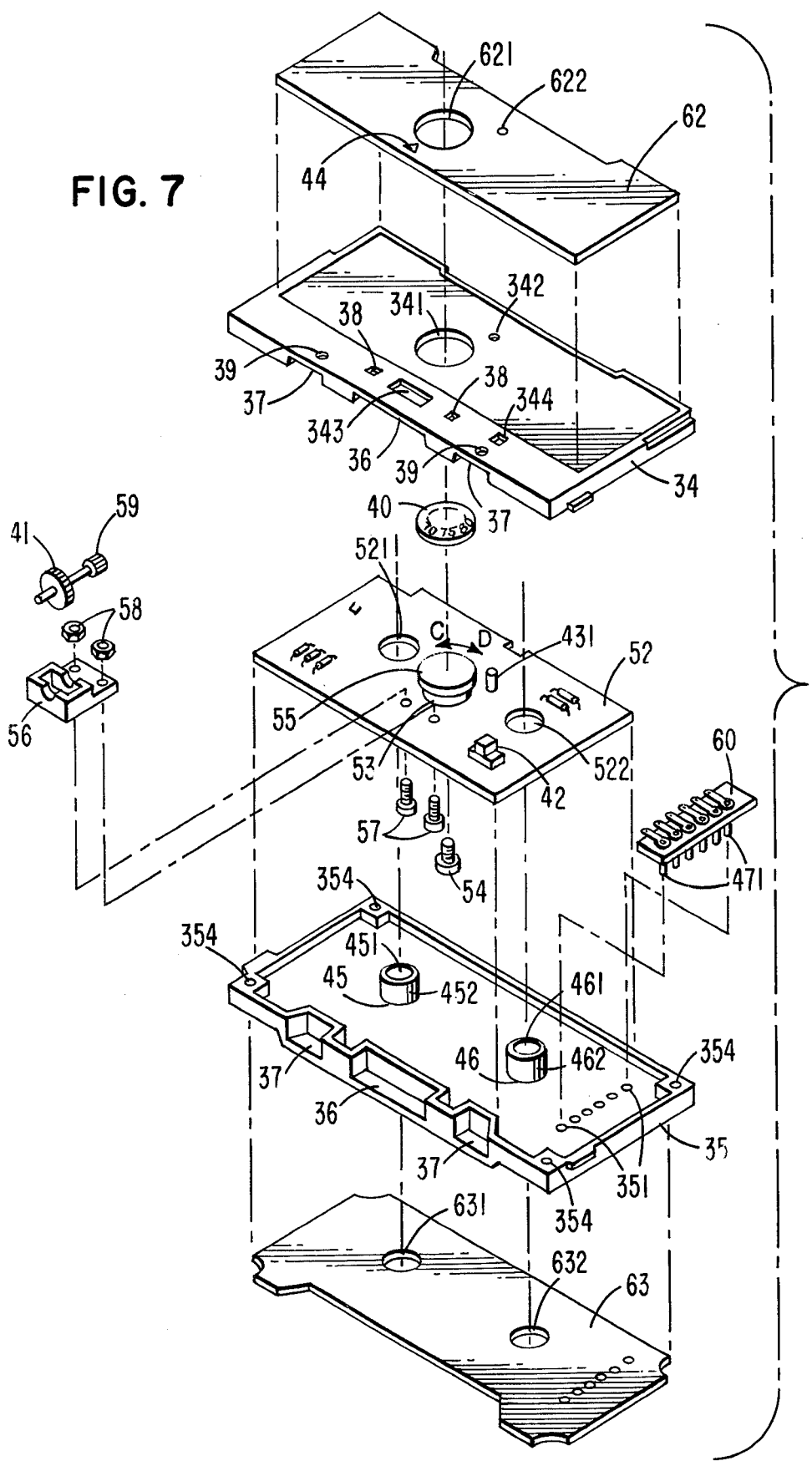
FIG. 7 is an exploded view of the tuner unit.

FIG. 7 is an exploded view of the tuner unit. As shown, rear casing 35 has a pair of recesses 45 and 46 as well as recesses 36 and 37. Recesses 45 and 46 comprise openings 451, 461 and cylinders 452, 462 perpendicular to openings 451, 461, respectively. The ends of cylinders 452, 462 are closed when rear casing 35 unites with front casing 34. A printed wiring plate 52 is held in rear casing 35. Plate 52 has a tuner circuit which comprises receiving, tuning, detecting and amplifying sections. A variable tuning capacitor 53 is rotatably attached to the center of plate 52 by screw 54. An umbrella shaped gear 55 is attached on the operation axis of capacitor 53. Rotation of gear 55 in the direction of arrow C or D varies capacitance of capacitor 53 to tune the tuner unit to the desired radio program. A support 56 is fixed to plate 52 near capacitor 53 via screws 57 and nuts 58. Support 56 supports a dial 41 which can be rotated to select programs. A gear 59, which is coaxially coupled to dial 41, engages gear 55. As a result, in response to the rotation of dial 41, the tuner unit is tuned. Tuning indication plate 40 is attached to the flat top plane of gear 55 and LED 431 of indicator 43 and switch 42 are fixed to plate 52. Pins 47 pass through holes 351 of rear casing 35. Plate 52 has a pair of penetration holes 521 and 522 for receiving cylinders 462 of rear casing 35.

Figure 8:
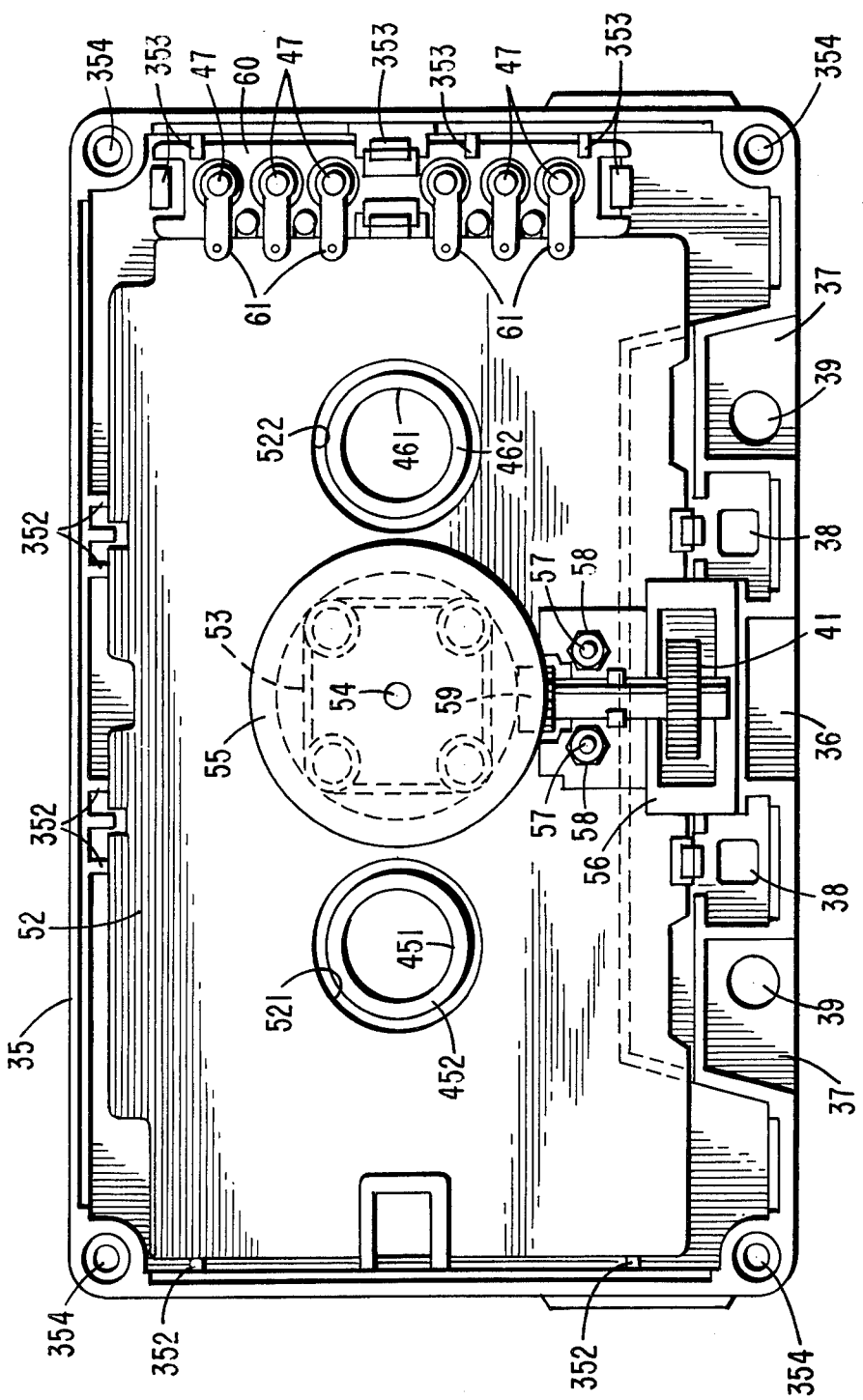
FIG. 8 is a plan view of the interior of the tuner unit.

The position of plate 52, dial 41, pins 47 and support 60 in rear casing 35 is shown in FIG. 8. Plate 52 is supported by plural supports 352 which are formed on an inside wall of rear casing 35. Support 60 likewise is supported by plural supports 353 which are formed on an inside plane of rear casing 35. Lugs 61 are attached to pins 47 and coupled to the wiring pattern (not shown) of plate 52 via a lead line (not shown). Rear casing 35 has screw apertures 354 at all four corners for fastening rear casing 35 to front casing 34. As shown in FIG. 7, front casing 34 has holes 38 and 39 at its front end for receiving the cassette guide pins and capstan 50. It also has windows 341 and 342 in the center for observing plate 40 and LED 431. Casing 34 has holes 343 and 344 for receiving dial 41 and switch 42. Accordingly, dial 41 and switch 42 may be operated from the outside of the tuner unit. For the sake of simplicity, holes 38 and 39 of rear casing 35 are omitted in FIG. 7.

As further shown in FIG. 7, dressing papers 62 and 63 are attached to front and rear casings 34 and 35, respectively. Paper 62 has holes 621 and 622 for plate 40 and LED 431. An indicator 44 is painted on the front of paper 62. Paper 63 is placed beneath rear casing 35; it has holes 631, 632 at positions corresponding to recessses 45 and 46 of rear casing 35.

The magnetic flux generated by head 49 of the apparatus may have an undesirable influence on the tuner circuit of plate 52. Accordingly, it is desirable that recess 36 of casing 33 is formed by or include magnetic shield material. When casing 33 is formed by uniting front and rear casings 34 and 35, the interior is air tight to keep out dust and moisture.

Figure 9:
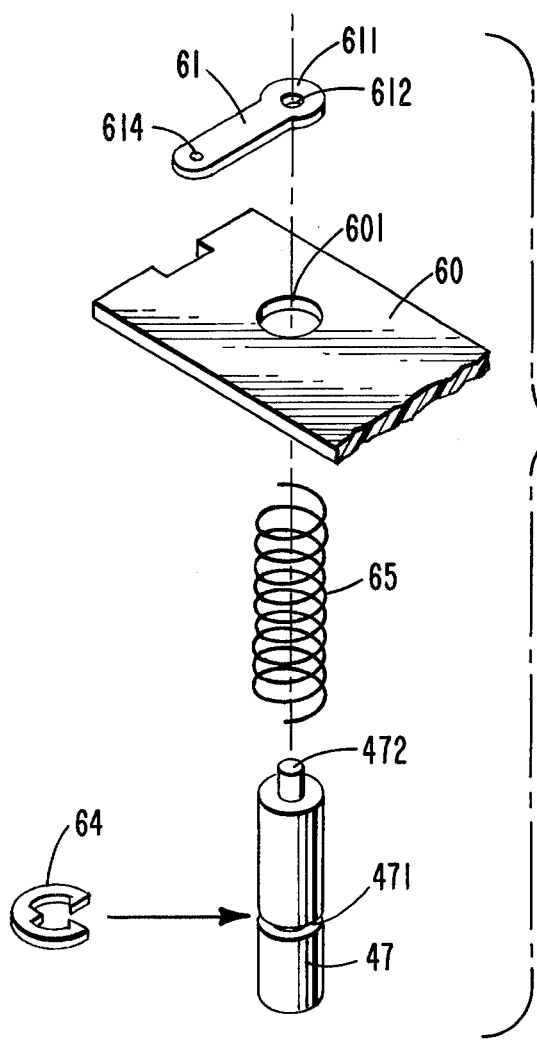
FIG. 9 is an exploded view of an electrode pin and pin support for the tuner unit.

Referring to FIG. 9, the relationship between pin 47 and support 60 is shown. Each pin 47 is formed by a column of conductive material. Pin 47 has a groove 471 near its center and along its circumference and a protrusion 472 at its top end. An E shaped ring 64 is attached to groove 471 of pin 47. Pin 47 passes through a coil spring 65 and hole 601 of support 60. Protrusion 472 of pin 47 is calked after it passes through hole 612 at base 611 of lug 61.

Figure 10:
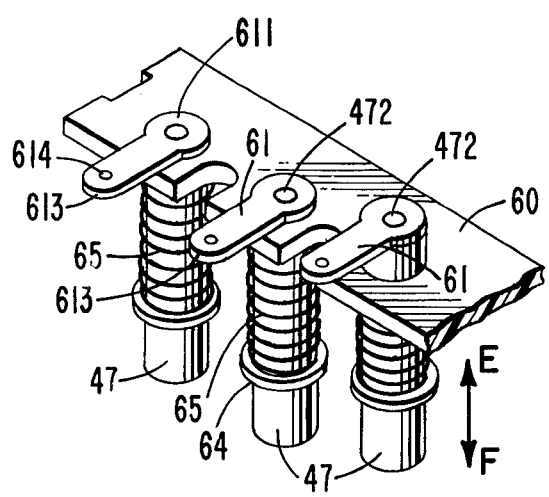
FIG. 10 is a perspective view showing the support structure for the electrode pins.

The arrangement of pins 47 on support 60 is shown in FIG. 10. Pins 47 are slidable in the directions of arrows E and F. Springs 65 bias these pins in the direction of arrow F due to the reaction force on ring 64. The bottom portion of pins 47 below ring 64 protrudes through holes 351 of rear casing 35. Finally, each lug 61 has an aperture 614 at its end 613 which is coupled to the wiring pattern of plate 52 via the lead line.

Figure 11:
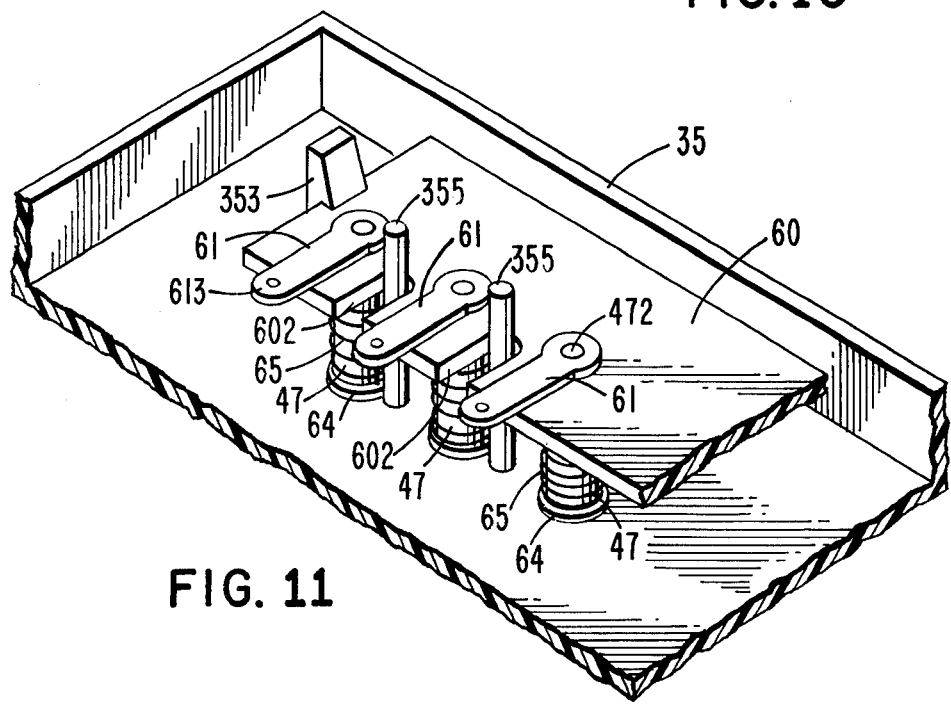
FIG. 11 is a perspective view showing the electrode pins and support structure positioned in the rear of the casing of the tuner unit.
Figure 12:
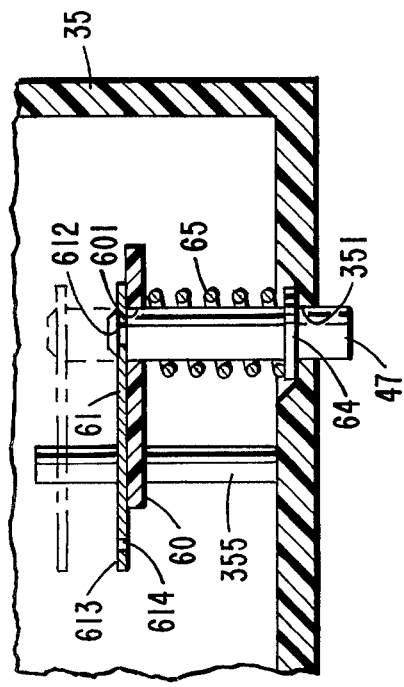
FIG. 12 is a cross-sectional view showing the height of the electrode pins and the rear of the casing.

The position of pins 47 and support 60 in rear casing 35 is shown in FIG. 11. Support 60 has plural notches 602 on one side, each of which is positioned between neighboring pins 47. Rear casing 35 has a number of supports 353 to support the support 60 and a number of column protrusions 355. Each protrusion 355 is positioned in each notch 602 of support 60 when support 60 is supported by supports 353 of rear casing 35. Furthermore, the height of each protrusion is such that the protrusion always extends between ends 613 of neighboring lugs 61, even if pins 47 are pushed up against the bias force of spring 65, as shown by the dotted lines in FIG. 12. Accordingly, even if lug 61 turns around its base 611, end 613 of lug 61 does not contact another lug. Protrusions 355 also function as guides for pins 47.

Modifications may be made in the assembly of the above pins and supports. Lug 61 can be first attached to protrusion 472 of pin 47. Then, after pin 47 passes through support 60 and spring 65, ring 64 can be attached to groove 471. The coupling of the wiring pattern of plate 52 to lugs 61 may be done either before or after pin 47 passes through spring 65. Accordingly, assembly of pins 47 and the other elements can be easily achieved in several steps.

Figure 13:
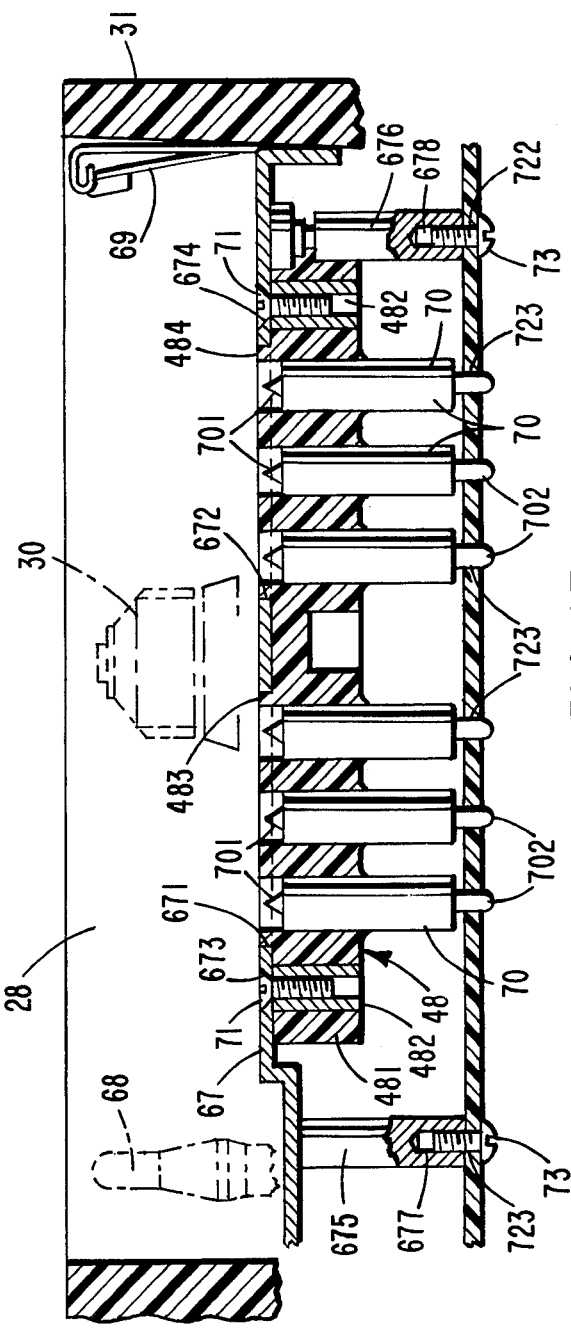
FIG. 13 is a cross-sectional view of a holding portion of the apparatus for holding a tape cassette and the tuner unit.

Next, the receiving device 48 in holding portion 28 of the apparatus body is described with reference to FIG. 13. Holding portion 28 includes a pair of reel holders 29 and 30 and a pair of guide pins 68. Only one holder 29 and guide pin 68 are shown in FIG. 13. The holder 29 and guide pin 68 are positioned in holding plate 67 of holding portion 28. Reel holders 29 and 30 and guide pins 68 are coupled to the operating mechanism (not shown) of the apparatus below plate 67. One wall of holding portion 28 has a plate spring 69 which provides a downward bias to tape cassettes and the tuner unit when they are inserted.

Plate 67 of holding portion 28 has a pair of substantially oval holes 671 and 672 at one side. Receiving electrode pins 70 (six pins), which are supported by receiving device 48 and correspond to pins 47 of the tuner unit, are hooked in each hole 671 and 672. Receiving device 48 is fixed to plate 67 of holding portion 28 by a pair of screws 71.

Figure 14A:
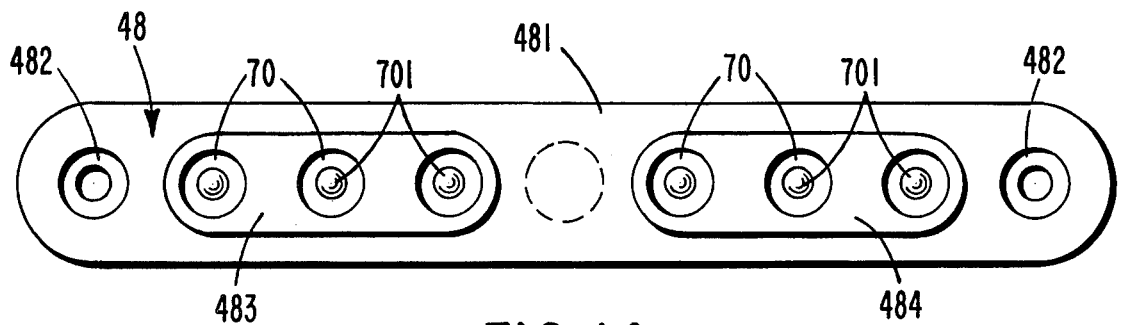
FIGs. 14(a) is a plan view of an electrode receiving device positioned in the holding portion, and 14(b) is a cross-sectional view of the electrode receiving device.
Figure 14B:
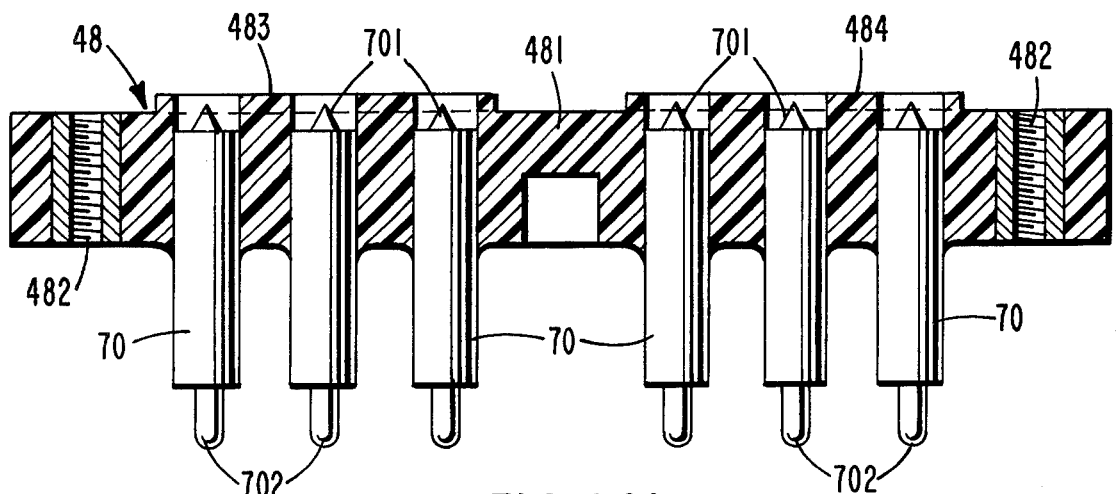

As shown in FIGS. 14(a) and (b), receiving device 48 comprises a substantially oval support 481 which is made of synthetic resin material. Electrode pins 70 are placed in intermediate portions of support 481 and a pair of elements 482 which have screw grooves in their internal walls are placed at both ends of support 481. Each pin 70 has a substantially cylindrical shape and a conical protrusion 701 at the top. Furthermore, each pin 70 has a connection electrode 702 at its bottom. Support 481 has steps 483 and 484 on its surface which correspond to holes 671 and 672 of plate 67. Steps 483 and 484 of support 481 have a thickness approximately corresponding to the thickness of plate 67. Plate 67 has holes 673 and 674 at positions corresponding to elements 482 of support 481. Screws 71 pass through holes 673 and 674 of plate 67 and are screwed to elements 482 of support 481.

Figure 15:
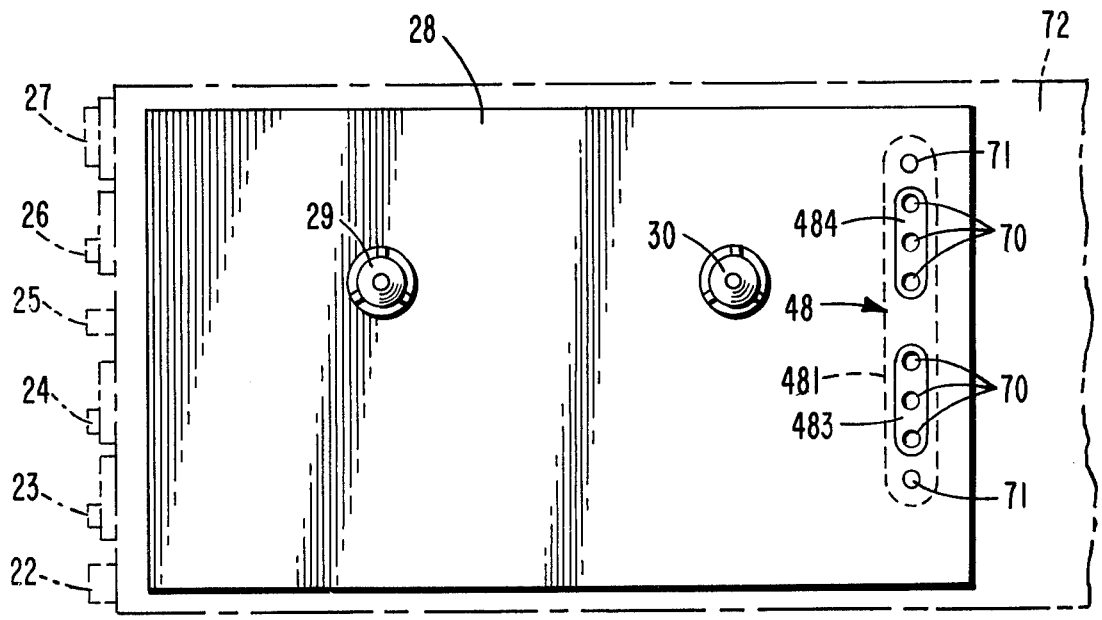
FIG. 15 is a plan view of the holding portion of the apparatus.

Again referring to FIG. 13, a number of stick shaped supports 675 and 676 are attached beneath plate 67. These supports have screw holes 677 and 678 at their ends. A printed wiring plate 72, which constitutes the circuit section of the apparatus, has a number of penetration holes 721 and 723 in positions which correspond to supports 675 and 676 and connection electrode pins 702 of receiving electrode pins 70. Screws 73 attach plate 72 to supports 675 and 676 and each connection electrode 702 passes through each hole 723 of plate 72. Each connection electrode 702 is soldered to the wiring pattern of plate 72. A plan view of holding portion 28, with the receiving device 48, plate 72 and other elements, is shown in FIG. 15. Battery indicator 22, tape selector 23, noise reduction selector 24, radio indicator lamp 25, radio tape selector 26, headphone jack 27, etc. are mounted on one side of plate 72 in a line.

Since each receiving electrode pin 70 is placed at a predetermined position on support 481, the pins can be properly positioned by merely placing support 481 in the correct position of plate 67 of holding portion 28. Furthermore, since receiving electrode pins 70 are directly coupled to the wiring pattern of plate 72, space is efficiently utilized and the apparatus may be made more compact. Finally, since protrusions 701 of each receiving electrode pin 70 have a conical shape, a reliable electrical contact is made between each pin 47 and each pin 70, even if dust exists at top of pin 70.

Figure 16A:
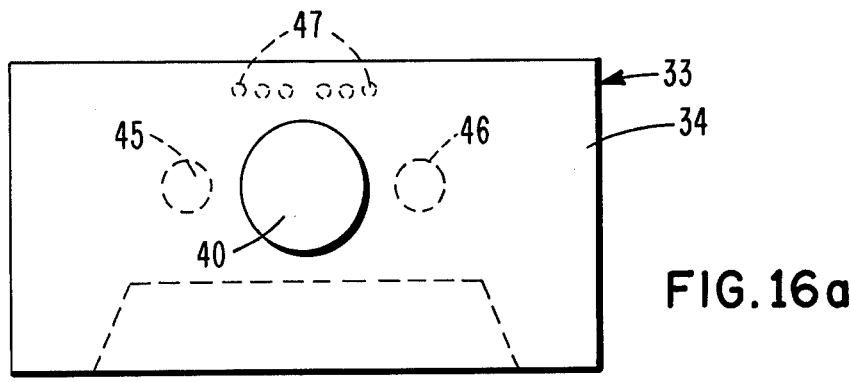
FIGS. 16 (a) and (b) are rear views of modified tuner units.
Figure 16B:
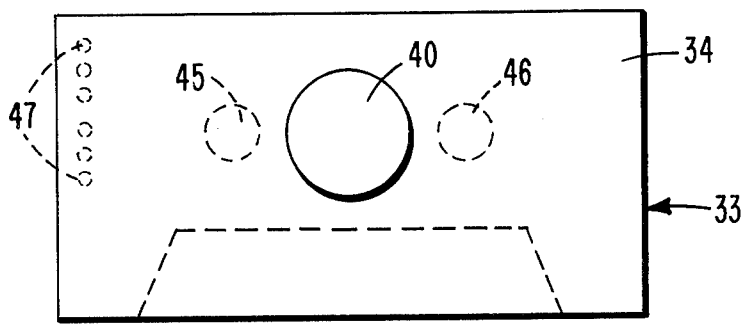

As shown in FIGS. 16(a) and (b), electrode pins 47 may be positioned at various locations on the tuner unit. Of course, the position of receiving element 48 must be changed in accordance with the change in position of pins 47.

Figure 17:
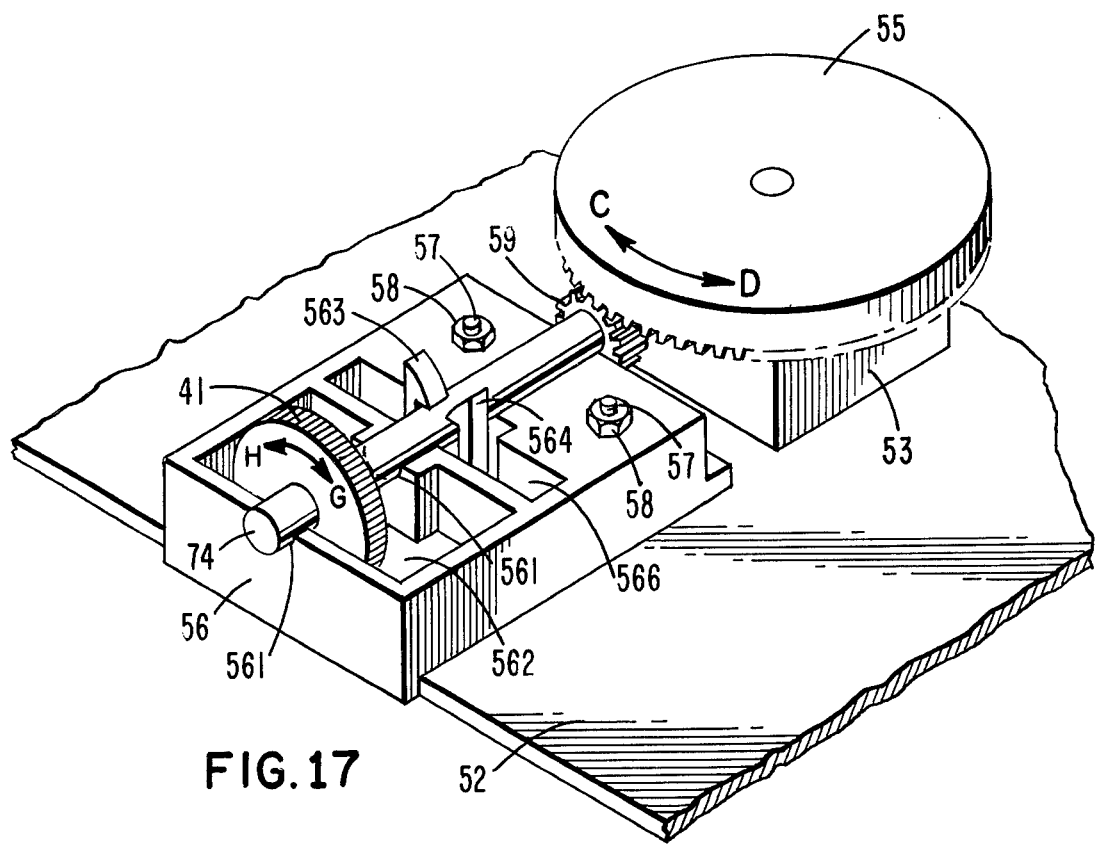
FIG. 17 is a perspective view showing the attachment of a program selecting dial.

The construction of dial 41 is shown in detail in FIG. 17. Dial 41 is linked to gear 59 via shaft 74, which has a smaller diameter than gear 59. Support 56 is a synthetic resign material which has a substantially rectangular shape. Shaft 74 is placed in recess 561 of support 56. The dial 41 is placed in groove 562 in the front of support 56. A pair of support bars 563 and 564 protrude from support 56 in a second groove 566 to hold shaft 74 in recess 561.

Support 56 is fixed to printed wiring plate 52 by two pairs of screws 57 and nuts 58 (see FIG. 7). Shaft 74 then is placed in recess 561 of support 56 and held by supports 563 and 564. Dial 41 is positioned in groove 562 for rotation in the direction of either arrow G or H. Since the diameter of shaft 74 is smaller than that of gear 59, shaft 74 cannot move in its axial direction. Accordingly, no additional parts are necessary to prevent shaft 74 from moving in its axial direction.

As mentioned above, since gear 59 meshes with gear 55, which is attached to the axis of condenser 53, gear 55 rotates in the direction of arrows C and D in response to the operation of dial 41. Accordingly, the capacitance of condenser 53 is varied.

A modified support 56 is shown in FIG. 18. In this embodiment, support 56 has a number of protrusions 565 on its rear surface which pass through apertures 521 of plate 52 to reliably mount support 56 to plate 52. Since support 56 does not need screws and nuts for attachment to plate 52, the construction is simplified and assembly is made easy.

Figure 19:
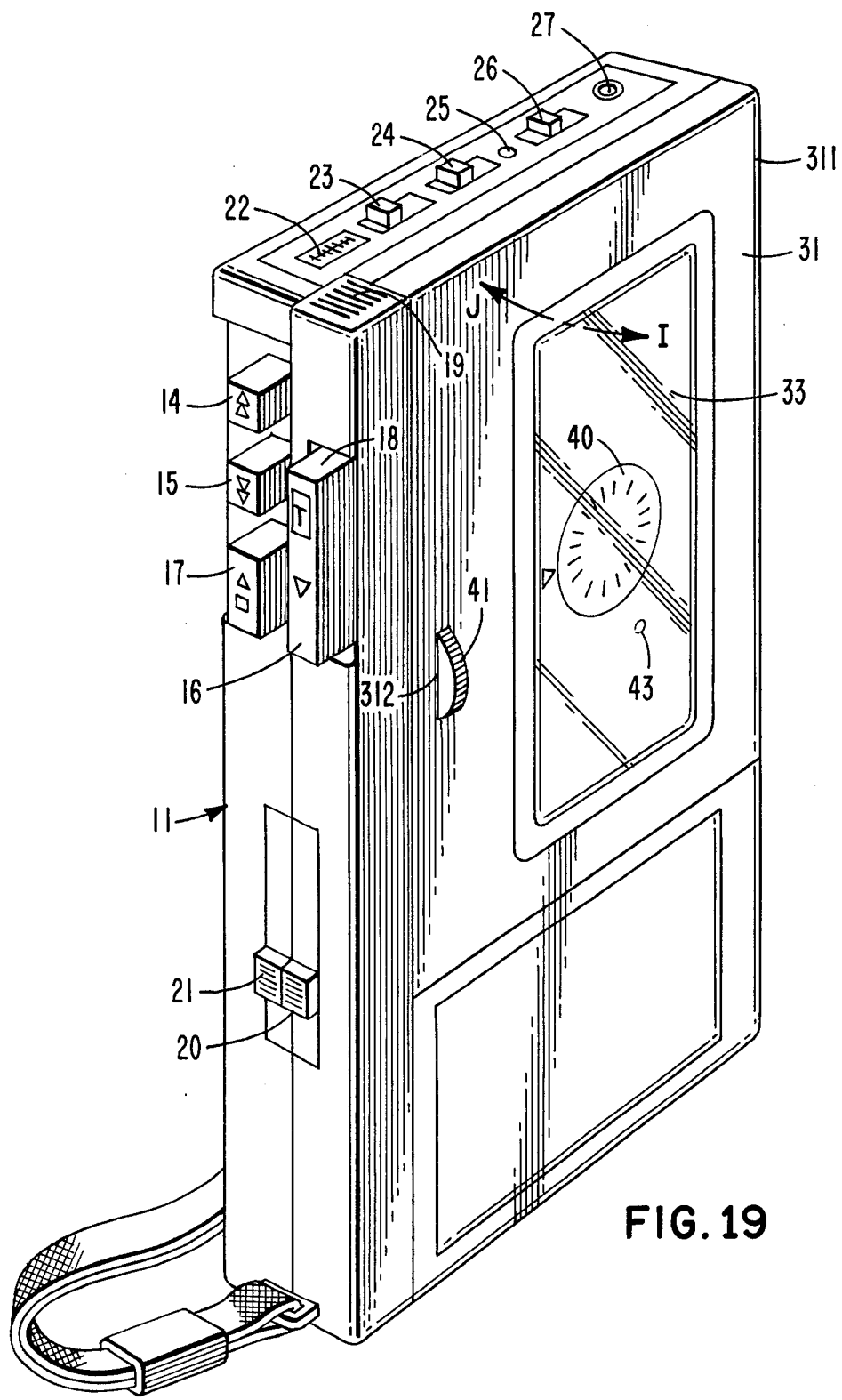
FIG. 19 is a perspective view of the apparatus with the tuner unit inserted.

The apparatus with the tuner unit inserted is shown in FIG. 19. Cassette cover 31 can be opened and closed around its base 311 in the directions of arrows I and J. Dial 41 protrudes through hole 312 when the tuner unit is inserted holding portion 28. As shown in FIG. 20, hole 312 has an inclined wall spreading toward the outside of cover 31 so that dial 41 may be easily operated. Thus, even if cover 31 is closed, dial 41 may be operated.

Cover 31 also has a hole for switch 42 of the tuner unit so switch 42 may be operated from the outside of cover 31 when cover 31 is closed. If the tuner unit is a frequency synthesizer tuner, there may be a hole in place of hole 312 for the operating mechanism of the tuner for varying tuning frequency.

A pair of volume control sliders 20 and 21 are attached to body 11 of the apparatus as shown in FIG. 21. Slider 20 has a substantially rectangular shaped element 204 with an L-shaped protrusion 205 formed at its left side. Slider 21 also has a substantially rectangular shaped element 214 with an L-shaped protrusion 215 formed at its right side. Operating buttons 206 and 216 are attached to one end of elements 204 and 214, respectively. Sliders 20 and 21 are mounted adjacent each other on body 11 when front and rear cabinets 12 and 13 are fastened together. Accordingly, elements 204 and 214 and protrusions 205 and 215 of sliders 20 and 21 are positioned in body 11 so operating buttons 206 and 216 pass through hole 111 to the outside of the body 11. A support plate 75 mounted in cabinets 12 and 13 supports sliders 20 and 21 in a sliding position. As shown in FIGS. 22 and 23, plate 75 has a substantially rectangular shape and a pair of protrusions 751 and 752 formed on both sides. Protrusions 751 and 752 correspond to the shape of protrusions 205 and 215 of sliders 20 and 21. Protrusions 751 and 752 are placed in recesses 121 and 131 formed in the interior walls of front and rear cabinets 12 and 13 to hold support 75. Sliders 20 and 21 also have ridges 207 and 217 which contact the interior wall of cabinets 12 and 13 and the surface of support plate 75. Accordingly, minimal contact occurs between cabinets 12 and 13, plate 75 and sliders 20 and 21 so the operation of sliders 20 and 21 is smooth and rattle free.

As further shown in FIG. 21, elements 204 and 214 of sliders 20 and 21 have holes 208 and 218 at one end. As shown in FIG. 24, one end of a pair of wires 76 and 77 passes through holes 208 and 218, respectively. The other ends of wires 76 and 77 are connected to sliders 781 and 791, respectively, which are slidably attached to variable resistors 78 and 79. When sliders 20 and 21 slide in the direction of arrow A or B, sliders 781 and 791 slide likewise via wires 76 and 77. Accordingly, the resistance of variable resistors 78 and 79 are varied to adjust the volume of the left or right channel.

The manner of connecting slider 781 and wire 76 is shown FIG. 25. The manner of connecting slider 791 and wire 77 is the same. Slider 781 has a hole 782 in its intermediate portion. Wire 76 is bent into a substantially U-shape so that it may enclose slider 781 and protrude into hole 782. The bent length $l_2$ of wire 76 is determined from the width $l_1$ of slider 781 so wire 76 may be reliably connected to slider 781 to avoid rattling. Each wire 76 and 77 is formed by a rigid material having slight elasticity (e.g., piano line). If slider 781 shifts slightly, no problem occurs in the connection of wire 76 and slider 781. Furthermore, even if wire 76 touches wire 77, the volume control operaton is not adversely affected.

A modified volume control slider 811 is shown in FIGS. 26(a) and (b). The slider 811 controls the volume of both channels simultaneously. Element 812 of slider 811 which has a substantially rectangular shape, is slidably mounted in recesses 122 and 132 at the ends of the side walls of cabinets 12 and 13. As shown in FIG. 26(b), an elastic material (e.g., a sponge) 815 may be placed under element 812.

As mentioned above, when radio tape selector 26 is set to RADIO, the tape transportation motor of the apparatus is inactivated. Accordingly, if a tape cassette is inserted and selector 26 is set to RADIO, reel holders 29 and 30, capstan 50, etc. will not rotate. Although the PLAY button 16 functions as a switch for radio listening, the fact that head 49 continues to enter recess 36 during radio listening causes no problem. However, since it is undesirable to have pinch roller 51 continue to contact capstan 50 during radio listening, a protection mechanism is necessary to prevent pinch roller 51 from contacting capstan 50 during radio listening.

Figure 27:
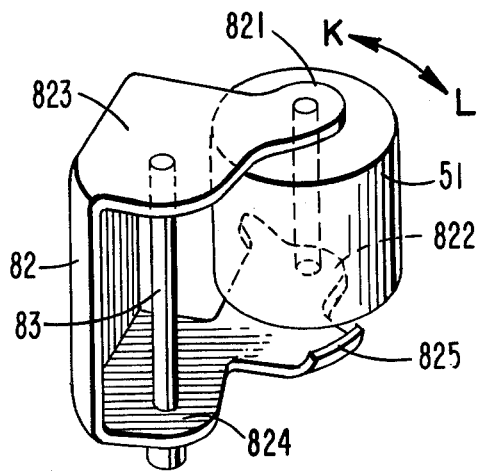
FIG. 27 is a perspective view of a pinch roller with a protection mechanism which prevents the pinch roller from contacting the capstan during operation as a radio.

A protection mechanism for pinch roller 51 is shown in FIG. 27. Pinch roller 51 is rotatably supported between ends 821 and 822 of pinch lever 82. Pinch lever 82 rotates in the direction of arrows K and L on shaft 83 which passes through bases 823 and 824 of lever 82. Shaft 83 is fixed to a main chassis (not shown) of the body of the apparatus or a head chassis (not shown) which carries head 49 (see FIG. 6). Pinch lever 82 is usually biased in the direction of arrow L. Pinch lever 82 engages a stopper formed on the head chassis. Since the head chassis does not move to the reproducing position when PLAY button 16 is not pressed, pinch roller 51 does not contact capstan 50. However, when the head chassis moves to the reproducing position in response to operation of PLAY button 16, pinch lever 82 turns in the direction of arrow L and pinch roller 51 turns toward capstan 50.

Figure 28:
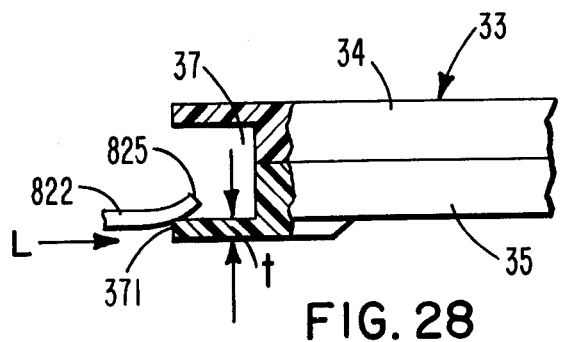
FIG. 28 is a partially sectional view of the protection mechanism shown in FIG. 27.

End 822 of the lower side of pinch lever 82 has a tab 825 which curves upwards. The thickness t of wall 371 (see FIG. 28) of rear casing 35 which forms recess 37 is larger than the thickness of the wall of a tape cassette. Accordingly, even if pinch lever 82 turns in the direction of arrow L, tab 825 engages the wall of rear casing 35 before pinch roller 51 contacts capstan 50. As a result, pinch roller 51 does not contact capstan 50. On the other hand, the thickness of the wall of a tape cassette which corresponds to wall 371 of rear casing 35 is thinner so pinch lever 82, including protrusion 825, can easily enter the tape cassette and contact capstan 50. Thus, tab 825 of pinch lever 82 discriminates between tape cassettes and the tuner unit to prevent pinch roller 51 from contacting capstan 50 when the tuner unit is inserted. Furthermore, tab 825 presses the tuner unit downwards when it contacts wall 371 of rear casing 35 so electrode pins 47 reliably contact receiving electrode pins 70.

Figure 29:
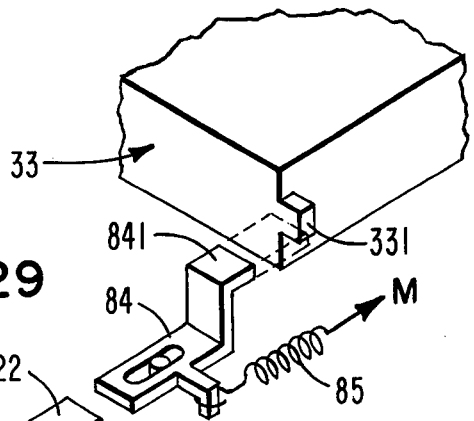
FIG. 29 is a perspective view showing a first modified protection mechanism for the pinch roller.

A first modified protection mechanism for pinch roller 51 is shown in FIG. 29. A protrusion 331 is formed on one side of casing 33 and a crank shaped detecting element 84 is slidably attached to the surface of holding portion 28 of the apparatus. One end 841 of the element 84 opposes protrusion 331 of the tuner unit when it is put in holding portion 28. The other end opposes end 822 of the lower side of pinch lever 82 (see FIG. 27). Furthermore, element 84 is biased by a spring 85 in the direction of arrow M.

Assuming the tuner unit is put in holding portion 28, protrusion 331 of casing 33 contacts one end portion 841 of element 84 to slide element 84 in the direction opposite arrow M against the bias force of spring 85. Even if the head chassis moves, which also controls the rotation of pinch lever 82, the other end 842 prevents pinch lever 82 from moving in the direction of arrow L to thereby prevent pinch roller 51 from contacting capstan 50. On the other hand, when a tape cassette is inserted, spring 85 moves element 84 in the direction of arrow M so pinch lever 82 is able to move in the direction of arrrow L. As a result, when a tape cassette is used, pinch roller 51 contacts capstan 50 in response to the movement of the head chassis.

Figure 30:
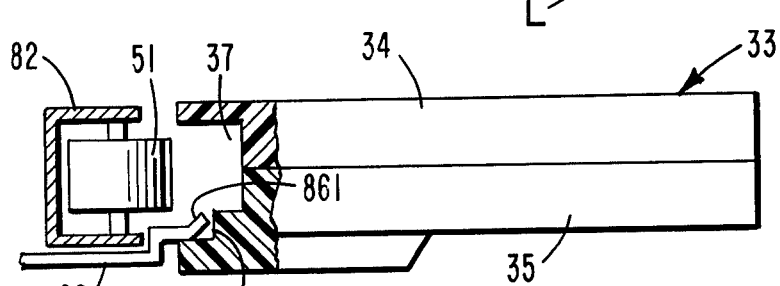
FIG. 30 is a side view showing a second modified protection mechanism for the pinch roller.

A second modified protection mechanism for pinch roller 51 is shown in FIG. 30. A tab 861 is formed at end of head chassis 86. Head chassis 86 carries head 49 and controls the turn of pinch lever 82 which is rotatably mounted to the main chassis of the apparatus. A step 352 is formed at the walls of rear casing 35 in recess 37. When head chassis 86 moves in response to operation of PLAY button 16, tab 861 engages step 352 to prevent pinch lever 82 from turning. Furthermore, tab 861 of head chassis 86 presses casing 33 of the tuner unit downwards when it contacts step 352 of the tuner unit so electrode pins 47 reliably contact receiving electrode pins 70.

Figure 31:
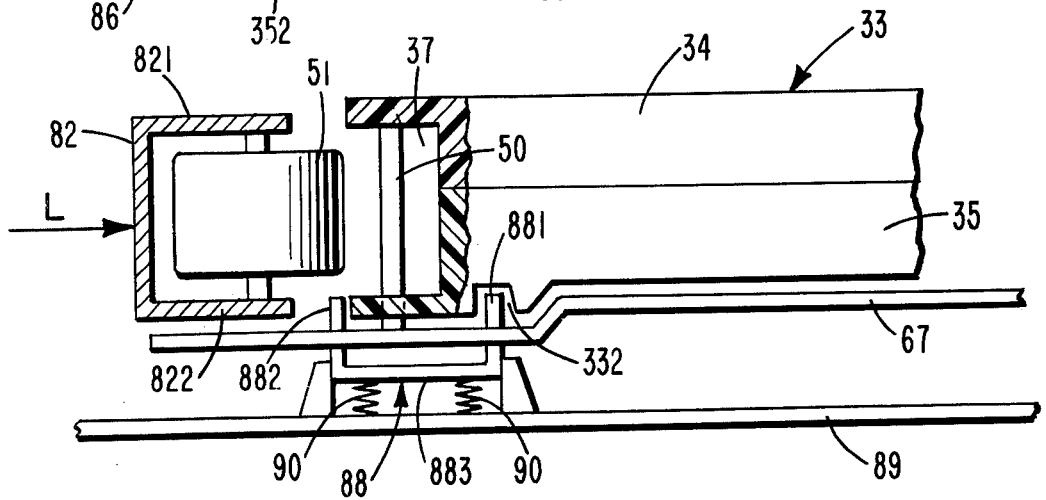
FIG. 31 is a side view showing a third modified protection mechanism for the pinch roller.

A third modified protection mechanism for pinch roller 51 is shown in FIG. 31. A recess 332 is formed in the rear of casing 33 of the tuner unit. Base 883 of a detecting element 88 is supported on main chassis 89 via coil springs 90. Both sides 882 of element 88 pass through holes (not shown) in holding plate 67 of holding portion 28. Accordingly, element 88 moves up and down, and is normally biased upwards. When the tuner unit is inserted in holding portion 28, one side 881 of element 88 enters recess 332 of casing 33. The other side 882 comes between end 822 of the lower side of pinch lever 82 and the end of casing 33 to prevent pinch lever 82 from moving in the direction of arrow L. As a result, pinch roller 51 does not contact capstan 50. On the other hand, when a tape cassette is inserted in holding portion 28, one side 881 of element 88 is pressed down by the cassette so the other side 882 does not come between pinch lever 82 and casing 33. Accordingly, pinch lever 82 can move in the direction of arrow L and pinch roller 51 can contact capstan 50.

Figure 32:
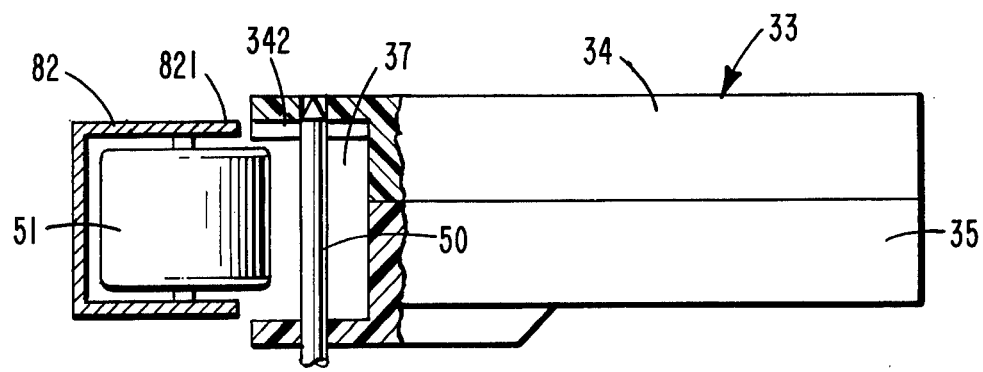
FIG. 32 is a side view showing a fourth modified protection mechanism for the pinch roller.

A fourth modified protection mechanism for pinch roller 51 is shown in FIG. 32. Front casing 34 of casing 33 has a thick wall 342 which forms recess 37. When the tuner unit is inserted in holding portion 28, end 821 of the upper side of pinch lever 82 contacts wall 342 of casing 33 if pinch lever 82 moves in response to movement of the head chassis. Accordingly, pinch roller 51 cannot contact capstan 50. On the other hand, when a tape cassette is inserted in holding portion 28, pinch roller 51 contacts capstan 50 since the wall of a tape cassette corresponding to wall 342 of the tuner unit is much thinner.

Fifth and sixth modified protection mechanisms for pinch roller 51 are shown in FIGS. 36(a) and (b). As shown in FIG. 36(a), a protusion 344 is formed on the end of wall 343 of front casing 34. An arm 826 is formed at end 821 of the upper side of pinch lever 82. When pinch lever 82 moves in response to the movement of the head chassis, arm 826 of pinch lever 82 engages protrusion 344 of the tuner unit so pinch roller 51 cannot contact capstan 50. Furthermore, when arm 826 of pinch lever 82 contacts protrusion 344 of the tuner unit, it presses the tuner unit downwards to urge electrode pins 47 into contact with receiving electrode pins 70. On the other hand, when a tape cassette is inserted in holding portion 28, pinch roller 51 contacts capstan 50.

Figure 33A:
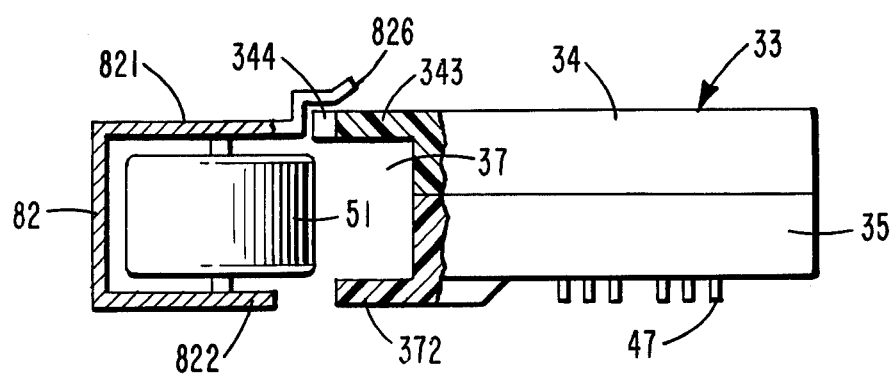
FIGS. 33 (a) and (b) are side views showing fifth and sixth protection mechanisms for the pinch roller.
Figure 33B:
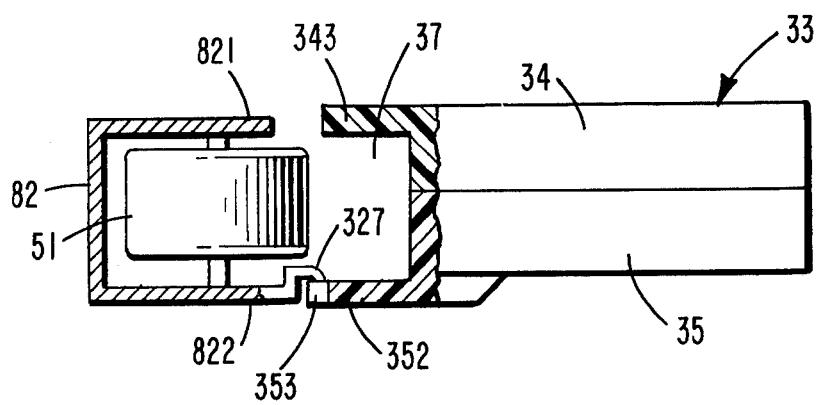

As shown in FIG. 33(b), a protrusion 353 is formed on the end of wall 352 of rear casing 35. An arm 827 is formed at end 822 of the lower side of pinch lever 82. When the tuner unit is inserted in holding portion 28, pinch roller 51 cannot contact capstan 50 and, as above, electrode pins 47 are urged into contact with receiving electrode pins 70. When a tape cassette is inserted in holding portion 28, pinch roller 51 contacts capstan 50.

Although illustrative embodiments of the invention have been described in detail with reference to the accompanying drawins, it is to be understood that the invention is not limited to those precise embodiments and that various changes and modifications may be effected therein by one skilled in the art without departing from the scope or spirit of the invention.

We claim:

1. A magnetic reproducing apparatus capable of operating in both a magnetic reproducing mode and a radio broadcast receiving mode, said magnetic reproducing apparatus comprising:
   a main chassis;
   a cassette holding portion on said main chassis for holding a tape cassette;
   switch means coupled to said apparatus for operating said apparatus in the reproducing mode and the radio broadcast receiving mode;
   a capstan mounted on said main chassis and protruding into said cassette holding portion;
   a pinch lever on said apparatus for movement toward said capstan in response to operation of said apparatus when said switch means is set in the reproducing mode;
   a pinch roller rotatably mounted on said pinch lever;
   a cassette type tuner unit for insertion in said cassette holding portion in the radio broadcast receiving mode; and
   protection means on said chassis for preventing said pinch roller from contacting said capstan when said cassette type tuner unit is inserted in said cassette holding portion.

2. The magnetic reproducing apparatus of claim 1 wherein said tuner unit has a recess opposite said pinch roller for receiving said pinch roller and said capstan.

3. The magnetic reproducing apparatus of claim 2 wherein said protection means comprises a tab on the lower side of said pinch lever and said tuner unit has an end wall adjacent said recess of said tuner unit which is thicker than a corresponding wall of a standard tape cassette.

4. The magnetic reproducing apparatus of claim 2 wherein the side of said tuner unit has a protrusion and said protection means comprises:
   a detecting element slidably mounted on said cassette holding portion, one end of which opposes said protrusion of said tuner unit and the other end opposes said pinch lever; and
   bias means for biasing said detecting element away from said pinch lever.

5. The magnetic reproducing apparatus of claim 2 further including a head chassis which carries a magnetic head and controls the movement of said pinch lever toward said capstan and wherein said protection means comprises a tab formed at one end of said head chassis, said tuner unit including a step formed in said recess to oppose said tab.

6. The magnetic reproducing apparatus of claim 2 wherein said tuner unit includes a second recess and said protection means comprises:
   a detecting element movably mounted on said main chassis, said detecting element having one end which protrudes into said second recess of said tuner unit and another end which protrudes between said pinch lever and the end of said tuner unit.

7. The magnetic reproducing apparatus of claim 2 wherein said protection means comprises:
   an end wall adjacent said pinch lever which is thicker than the corresponding end wall of a standard tape cassette.

8. The magnetic reproducing apparatus of claim 2 wherein said protection means comprises an arm formed at one end of at least one side of said pinch lever, said tuner unit including a protrusion formed at a corresponding end of said tuner unit adjacent said recess to oppose said arm.

9. A magnetic reproducing apparatus capable of operating in both a magnetic reproducing mode and a radio broadcast receiving mode, said magnetic reproducing apparatus comprising:
   a main chassis;
   a cassette holding portion on said main chassis for holding a tape cassette;
   switch means mounted on said main chassis for operating said apparatus in the reproducing mode and the radio broadcast receiving mode;
   a capstan mounted on said main chassis and protruding into said cassette holding portion;
   a pinch lever movably mounted on said main chassis for movement toward said capstan in response to operation of said apparatus when said switch means is set in the reproducing mode;
   a pinch roller rotatably mounted on said pinch lever;
   a cassette type tuner unit for insertion in said cassette holding portion in the radio broadcast receiving mode; and
   protection means on said chassis for preventing said pinch roller from contacting said capstan when said cassette type tuner unit is inserted in said cassette holding portion.

10. A cassette type tuner unit for a magnetic reproducing apparatus capable of operating in both magnetic reproducing mode and a radio broadcast receiving mode, said magnetic reproducing apparatus having a main chassis, a cassette holding portion on said main chassis for holding a tape cassette, switch means for operating said apparatus in the reproducing mode and the radio broadcast receiving mode, a capstan mounted on said main chassis annd protruding into said cassette holding portion, a pinch lever for movement toward said capstan in response to operation of said apparatus when said switch means is set in the reproducing mode and a pinch roller rotatably mounted on said pinch lever, said cassette type tuner unit comprising:
   a recess opposite said pinch roller for receiving said pinch roller and said capstan; and
   protection means for preventing said pinch roller from contacting said capstan when said tuner unit is inserted in said cassette holding portion.

11. The cassette type tuner unit of claim 10 wherein said protection means comprises an end wall adjacent said recess of said tuner unit which is thicker than a corresponding wall of a standard tape cassette.

12. The cassette type tuner unit of claim 10 wherein said protection means comprises a protrusion mounted at the side of said tuner unit.

13. The cassette type tuner unit of claim 10 wherein said protection means comprises a step formed in said recess.

* * * * *